US008062403B2

(12) United States Patent
Goode

(10) Patent No.: US 8,062,403 B2
(45) Date of Patent: Nov. 22, 2011

(54) FILTER ELEMENTS FOR CIRCULATING AIR SYSTEMS

(76) Inventor: Jim Goode, Dallas, TX (US)

(*) Notice: Subject to any disclaimer, the term of this patent is extended or adjusted under 35 U.S.C. 154(b) by 589 days.

(21) Appl. No.: 12/250,399

(22) Filed: Oct. 13, 2008

(65) Prior Publication Data

US 2009/0094952 A1    Apr. 16, 2009

Related U.S. Application Data

(60) Provisional application No. 60/998,772, filed on Oct. 12, 2007.

(51) Int. Cl.
*B01D 50/00* (2006.01)
(52) U.S. Cl. ............... 55/485; 55/482; 55/486; 55/487; 55/488; 55/489; 55/490; 55/491; 55/492; 55/501; 55/522; 55/524; 55/525; 55/528
(58) Field of Classification Search .................. 55/482, 55/485–489, 490, 491–492, 501, 522, 524–525, 55/528, 495, DIG. 31
See application file for complete search history.

(56) References Cited

U.S. PATENT DOCUMENTS

| | | | | |
|---|---|---|---|---|
| 2,597,927 | A * | 5/1952 | Endres .............................. 96/17 |
| 3,364,661 | A * | 1/1968 | Manherz et al. ............. 55/418.1 |
| 3,399,516 | A * | 9/1968 | Hough, Jr. et al. .............. 55/487 |
| 3,727,769 | A * | 4/1973 | Scholl ........................... 210/484 |
| 3,793,692 | A * | 2/1974 | Tate et al. ................... 29/896.62 |
| 4,141,703 | A * | 2/1979 | Mulchi ............................ 96/132 |
| 4,610,705 | A * | 9/1986 | Sarnosky et al. ............... 96/135 |
| 4,902,306 | A * | 2/1990 | Burnett et al. .................... 95/69 |
| 4,904,288 | A * | 2/1990 | d'Augereau .................... 55/485 |
| 5,037,455 | A * | 8/1991 | Scheineson et al. ............. 96/17 |
| 5,108,470 | A * | 4/1992 | Pick ................................ 96/58 |
| 5,336,299 | A * | 8/1994 | Savell ............................. 95/70 |
| 5,453,116 | A * | 9/1995 | Fischer et al. ................. 95/278 |
| 5,454,845 | A * | 10/1995 | Anahara et al. .............. 55/482.1 |
| 5,525,136 | A * | 6/1996 | Rosen ............................ 55/486 |
| 5,807,425 | A * | 9/1998 | Gibbs .............................. 96/66 |
| 5,989,320 | A * | 11/1999 | Rutkowski ....................... 96/55 |
| 6,152,978 | A * | 11/2000 | Lundquist ................... 55/385.1 |
| 6,156,089 | A * | 12/2000 | Stemmer et al. ................ 55/467 |
| 6,231,646 | B1 * | 5/2001 | Schweizer et al. ............... 96/17 |
| 6,372,004 | B1 * | 4/2002 | Schultink et al. .............. 55/382 |
| 6,464,761 | B1 * | 10/2002 | Bugli ............................. 96/135 |
| 6,478,858 | B2 * | 11/2002 | Angermann et al. .......... 96/143 |
| 6,524,360 | B2 * | 2/2003 | Cox et al. ....................... 55/382 |
| 6,764,533 | B2 * | 7/2004 | Lobiondo, Jr. ................... 96/66 |
| 6,811,588 | B2 * | 11/2004 | Niakin ........................ 55/385.3 |
| 6,923,911 | B1 * | 8/2005 | Beier et al. .................... 210/273 |
| 7,255,838 | B2 * | 8/2007 | Yuan et al. .................... 422/177 |
| 7,686,859 | B2 * | 3/2010 | Barratt ............................ 55/423 |
| 2001/0042361 | A1 * | 11/2001 | Cox et al. ....................... 55/382 |
| 2002/0088214 | A1 * | 7/2002 | Sherwood ...................... 55/486 |
| 2004/0083697 | A1 * | 5/2004 | Niakin ........................... 55/486 |

(Continued)

*Primary Examiner* — Jason M Greene
*Assistant Examiner* — Dung H Bui

(57) ABSTRACT

An improvement to a reusable filtering assembly used in circulating air systems for residential or commercial heating and air conditioning systems. A series of layers consisting of filtering materials disposed between two framing units are comprised of the following: expanded metal lath, a layer of small fiber material, a layer of large fiber material, a layer of small crimp wire cloth, a layer of small fiber material, and a last layer of expanded metal lath. The present invention further comprises a stage loaded series of layers wherein the direction of air flow is from the first layer to the sixth layer comprising: Expanded Metal Lath, Small Fiber, Large Fiber, Small Crimp Wire Cloth, Small Fiber, and Expanded Metal Lath.

12 Claims, 2 Drawing Sheets

U.S. PATENT DOCUMENTS

| | | |
|---|---|---|
| 2004/0148913 A2* | 8/2004 | Engel et al. ............... 55/428 |
| 2004/0154273 A1* | 8/2004 | Stephan .................... 55/495 |
| 2004/0250683 A1* | 12/2004 | Soane et al. ............... 96/226 |
| 2007/0020156 A1* | 1/2007 | Kraft et al. ................ 422/177 |
| 2007/0062168 A1* | 3/2007 | Adamini et al. ........... 55/486 |
| 2007/0175192 A1* | 8/2007 | Niakan et al. ............. 55/486 |
| 2007/0251200 A1* | 11/2007 | Volo et al. ................. 55/482 |
| 2008/0168754 A1* | 7/2008 | Frey et al. ................. 55/488 |

* cited by examiner

FILTER ELEMENTS FOR CIRCULATING AIR SYSTEMS

CROSS-REFERENCE TO RELATED APPLICATION

This application claims the benefit of the priority date of provisional application 60/998,772, filed on Oct. 12, 2007.

FEDERALLY SPONSORED RESEARCH

Not Applicable

SEQUENCE LISTING OR PROGRAM

Not Applicable

STATEMENT REGARDING COPYRIGHTED MATERIAL

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

BACKGROUND

Novelty filtering systems comprising multiple layers are known in the prior art, as are filtering elements for circulating air.

For example U.S. Pat. No. 4,904,228 to d'Augereau discloses a reusable filtering element for residential or commercial heating and air conditioning systems. Although this invention comprises a filtering means for large and small particles separation, the placement order of the various layers plug up the filters catch cell. Furthermore, it impairs the ability for cleaning the system with respect to hair, lint, or grease applications. The prior art consists of further draw backs in the means of bracing the corners of the filtering system, particularly with rivets. Bracing the corners this way exhausts the possibility of disassembling the system, using it in highly corrosive environments, and the ability to clean each layer separately.

The d'Augereau reference also comprises HERSITE coated paint, and rejects the usage of filtering systems in food grade applications. Particularly, this paint has previously chipped off during high pressure cleaning, which has then entered air streams.

Therefore, it is the objective of the present invention to address the need for a novel and more effective filtering system comprising: efficient filter layer arrangements, rivetless corner connections, and a powder coated grids.

SUMMARY

The present invention comprises a reusable air filter assembly for circulating air systems. The assembly contains sandwiched materials comprising filtering layers. Each layer comprises a filtering feature which contributes to removing airborne particles in a circulating air system. The layered arrangement of the assembly is stage loaded, in the direction of airflow, as follows: expanded metal lath, small fiber, large fiber, small crimp wire cloth, small fiber, and expanded metal lath.

The air filter assembly contains support brackets at the junction of the framing means and further comprising stainless steal screws to improve the rigidity of the frame. In one preferred embodiment the support brackets are made of aluminum, comprising an "L" shape with two holes disposed thereon for fastening.

DESCRIPTION

Figure 1:
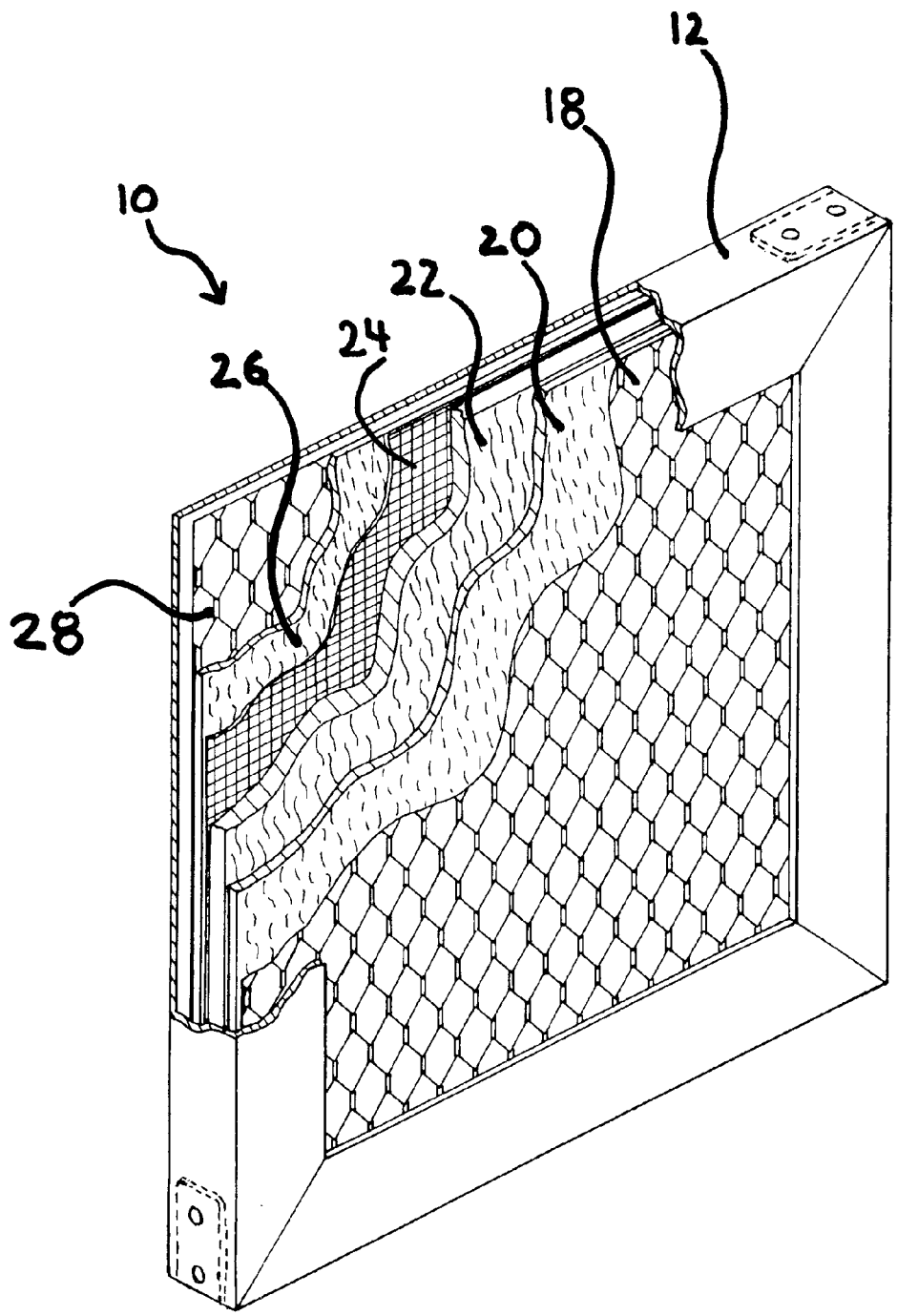
FIG. 1 is a perspective cut away view of the filter assembly.

Referring to FIG. 1, an improvement on a reusable air filter assembly is shown and described. The filter assembly 10, comprises a framing means 12, for housing multiple filtering layers. In one preferred embodiment, the frame comprises four members connected to and disposed around the periphery of the filter. In another preferred embodiment, the framing means 12, comprises a sandwiched top frame unit and bottom frame unit, each of which is capable of sandwiching a number of layers of filtering materials. Each frame unit comprises a feature that overlaps the other, wherein a single screw can be disposed through the overlap to secure the framed units relative to each other.

A series of layers of filter material is sandwiched in the frame, comprising a first layer of expanded metal lath 18, a second layer of small fiber material 20, a third layer of large fiber material 22, a fourth layer of small crimp wire cloth 24, a fifth layer of small fiber material 26, and a sixth layer of expanded metal lath 28, wherein the direction of air flow is from the first layer to the sixth layer. In one preferred embodiment, small fiber material comprises warp and fill 12 mil monofil polypropylene, 4.5 oz/sq yd, honeycomb weave, 29×26 threads per inch; and large fiber material comprises warp and fill 20 mil monofil polypropylene, 10.2 oz/sq yd, honeycomb weave, 26×18 threads per inch.

Figure 2:
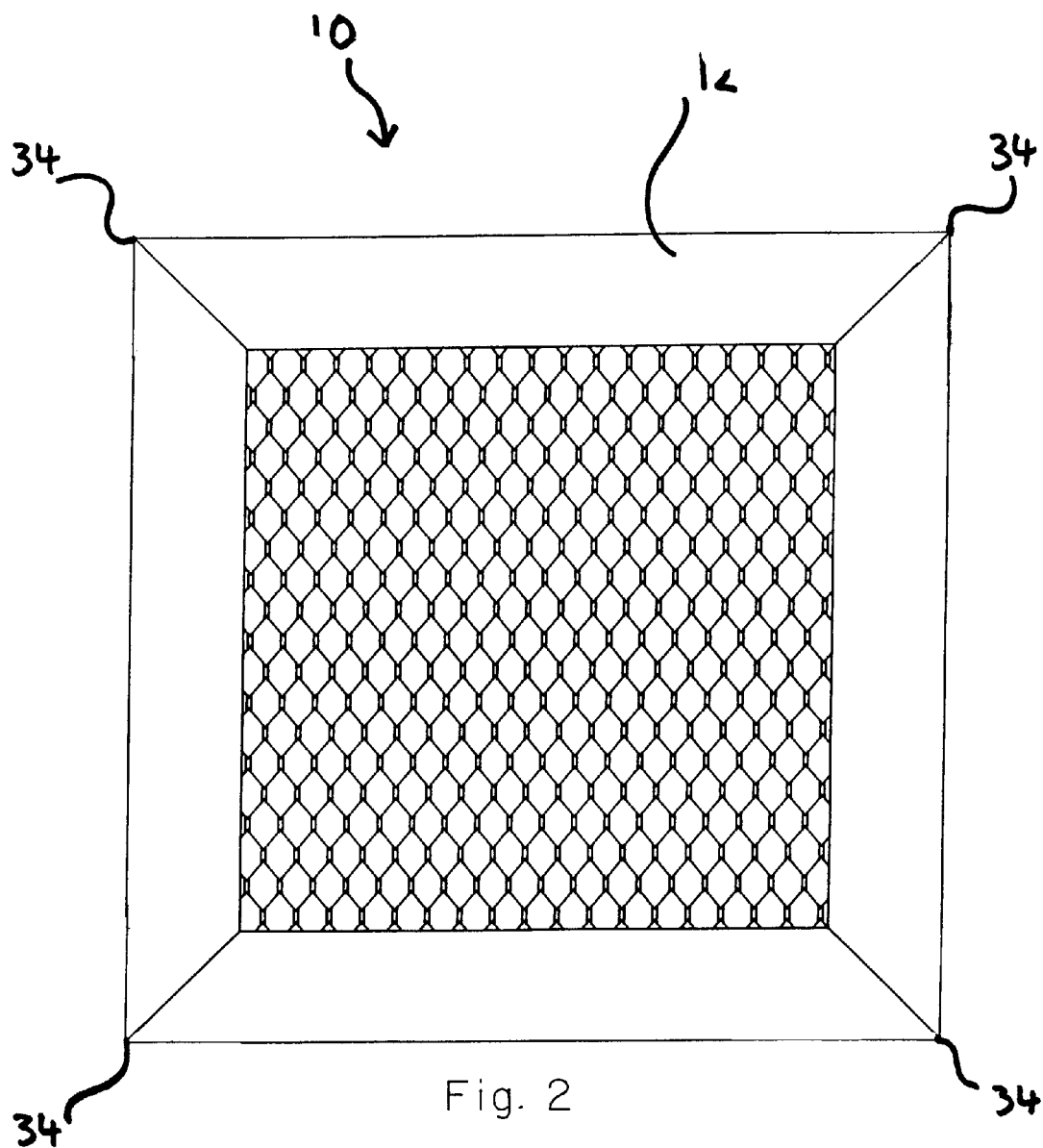
FIG. 2 is a front view of the filter assembly.

Referring to FIG. 2, the filter assembly 10 comprises a framing means 12 held in a substantially rectangular shape and rigid at the corner junctions 34. The corner junctions further comprise support brackets 32 (shown in FIG. 3) for holding the framing means 12 in a static position from the interiors of the corner junctions 34.

Figure 3:
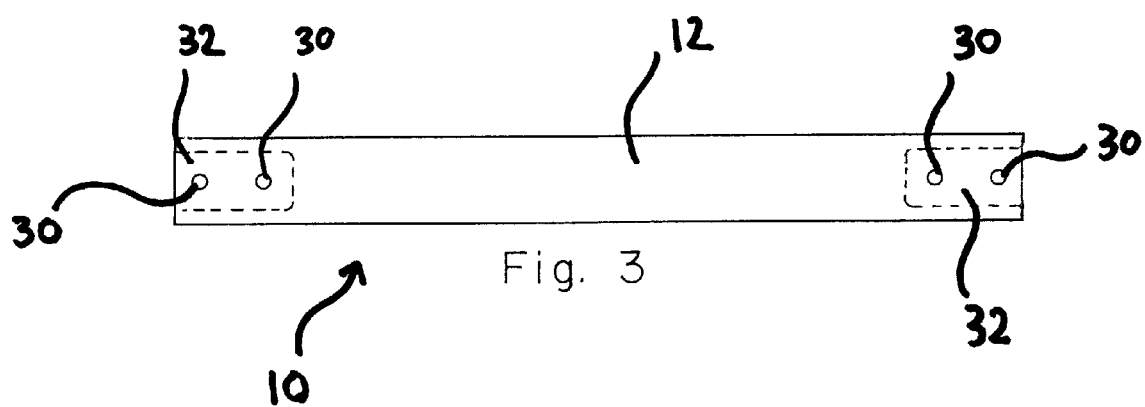
FIG. 3 is a side view of the filter assembly.

Referring to FIG. 3, the filter assembly 10 comprises support brackets 32 on the interior of the framing means 12 wherein stainless steel screws 30 extend through the support brackets 32. The stainless steel screws 30 also extend through the framing means 12 at a point of overlap between the framing means 12 and the support brackets 32. In one preferred embodiment the support brackets 32 are made of aluminum and comprise an "L" shape, with two arms, wherein each arm is 40 mm in length and 16 mm in width. Yet in the illustrative embodiment, the support bracket 32 comprises two holes on each arm, wherein each hole is spaced 4 cm apart.

Referring again to FIG. 1, a preferred embodiment of the filter assembly 10 comprising a sixth layer of an expanded metal lath 28 layer comprising steel. In another preferred embodiment the expanded metal lath 28 comprises galvanized steel. In yet another preferred embodiment, the expanded metal lath 28 comprises powder coated galvanized steel. In a particular preferred embodiment, the stainless steel screws 30 comprise an 8×½ inch modified truss head self drilling screw.

All features disclosed in this specification, including any accompanying claims, abstract, and drawings, may be replaced by alternative features serving the same, equivalent or similar purpose, unless expressly stated otherwise. Thus, unless expressly stated otherwise, each feature disclosed is one example only of a generic series of equivalent or similar features.

Any element in a claim that does not explicitly state "means for" performing a specified function, or "step for" performing a specific function, is not to be interpreted as a "means" or "step" clause as specified in 35 U.S.C. §112, paragraph 6. In particular, the use of "step of" in the claims herein is not intended to invoke the provisions of 35 U.S.C. §112, paragraph 6.

Although preferred embodiments of the present invention have been shown and described, various modifications and substitutions may be made thereto without departing from the spirit and scope of the invention. Accordingly, it is to be understood that the present invention has been described by way of illustration and not limitation.

What is claimed is:

1. A reusable air filter assembly for circulating air systems, comprising:
   a. a frame, comprising two frame units capable of sandwiching a number of layers of material, and each comprising a feature that overlaps the other, wherein a single screw can be disposed through the overlap to secure the frames relative to each other;
   b. a series of material disposed in the frame, containing a first layer of expanded metal lath, a second layer of small fiber material, a third layer of large fiber material, a fourth layer of small crimp wire cloth, a fifth layer of small fiber material, and a sixth layer of expanded metal lath, arranged in this order, wherein the direction of air flow is from the first layer to the sixth layer;
   c. screws anchoring the frame units in position; and
   d. support brackets for holding the frame units in position at corners of the frame units, wherein the screws extend through the support brackets and overlapping portions of the frame units.

2. The assembly of claim 1, wherein the support brackets comprise aluminum.

3. The assembly of claim 2, wherein the support brackets comprise "L" shaped members, with two arms, and wherein each arm is 40 mm in length and 16 mm in width.

4. The assembly of claim 3, wherein two holes are disposed on each arm.

5. The assembly of claim 4, wherein the holes are spaced 4 cm apart.

6. The assembly of claim 1, wherein the expanded metal lath comprises steel.

7. The assembly of claim 6, wherein the expanded metal lath comprises galvanized steel.

8. The assembly of 7, wherein the expanded metal lath comprises powder coated galvanized steel.

9. The assembly of claim 1, wherein the screws comprise stainless steel.

10. The assembly of claim 9, wherein the stainless steel screws comprise 8×½ modified tress drilling screws.

11. The assembly claim 1, wherein the small fiber material comprise warp and fill 12 mil monofil polypropylene, 4.5 oz/sq yd, honeycomb weave, 29×26 threads per inch.

12. The assembly of claim 1, wherein the large fiber material comprises warp and fill 20 mil monofil polypropylene, 10.2 oz/sq yd, honeycomb weave, 26×18 threads per inch.

* * * * *